United States Patent Office.

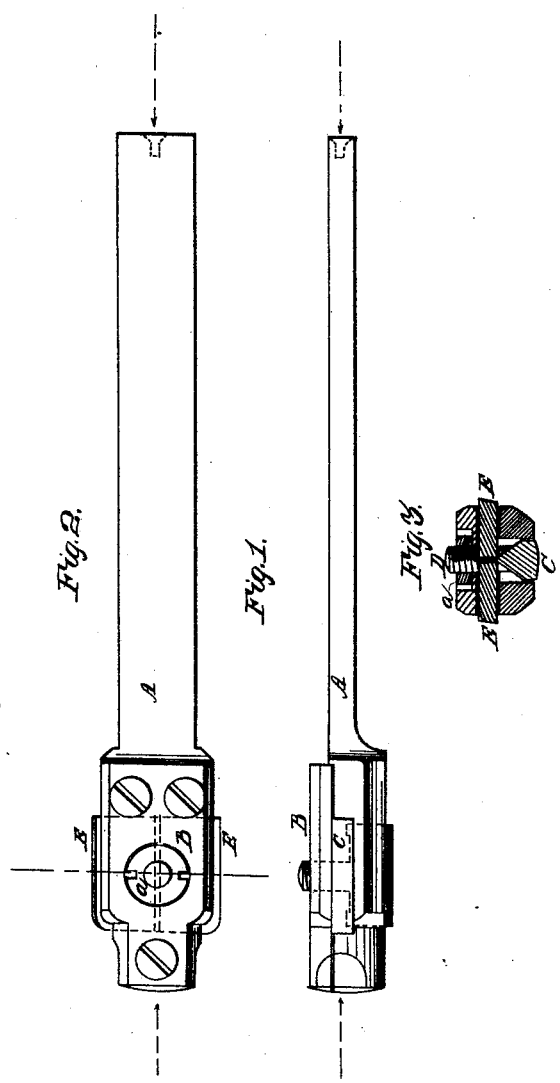

GILBERT MACKINNON, OF MILBURY, MASSACHUSETTS, ASSIGNOR TO HIMSELF AND HOSEA CRANE, OF THE SAME PLACE.

*Letters Patent No. 69,825, dated October 15, 1867.*

IMPROVED EXPANSION-DRILL.

*The Schedule referred to in these Letters Patent and making part of the same.*

TO ALL WHOM IT MAY CONCERN:

Be it known that I, GILBERT MACKINNON, of Milbury, in the county of Worcester, and State of Massachusetts, have invented a new and useful Improvement in Expansion-Drills; and I do hereby declare that the following is a full, clear, and exact description thereof, which will enable others skilled in the art to make and use the same, reference being had to the accompanying drawings, forming part of this specification.

This invention relates to a new and useful improvement in the kind of tool called by machinists a boring-drill, and the invention consists in attaching expansible cutters to a suitable cutter-holder, and expanding the same by a wedge and screw, arranged so that by turning the nut on the screw the size of the tool can be varied, and different-sized holes bored out with the same tool, as I will proceed to describe.

Figure 1 represents an edge view of the tool.

Figure 2 is a top view of the same.

Figure 3 is a cross-section through the line $x\ x$ of fig. 2.

Similar letters of reference indicate like parts.

A is the cutter-holder. B is a cap-piece, attached to the holder by screws. C is the wedge, which has a screw-shank, D. $a$ is a nut on the screw D, which is sunken in the cap-piece B. E represents the cutters. The cutter-holder is formed with a recess, seen in fig. 1 at $c$, which recess is covered by the cap-piece B, forming thereby a slot, in which the cutters are placed, and in which they are expanded by the wedge C. The cutters are placed in this slot with their inner edges in contact, or nearly so, as represented in fig. 3, with the wedge C in contact with them. This wedge is upon one side of what may be termed the head of the screw D, so that when the nut $a$ is turned down the cutters are expanded by drawing the wedge between them. The head of the screw or wedge passes through the cutter-holder in a slot, and serves as a guide to steady the screw. The nut $a$, being sunken into the face of the cap-piece, as seen in fig. 2, serves the same purpose. $d$ represents the centre holes in the end of the cutter-holder, from which the tool is driven forward by the lathe-spindle.

This tool, as well as the ordinary boring-drills of this class, is designed for boring chucked work of various kinds, as wheels, pulleys, &c.; and it will be seen that by having a very few of these cutter-holders and cutters almost any sized hole can be bored by expanding or properly adjusting the same, thereby saving much expense in the item of boring-drills in all machine-shops.

What I claim as new, and desire to secure by Letters Patent, is—

1. The arrangement of the cutters E in the recess $e$ of the holder A, and held in position between the holder and plate B by means of the set-screws, as herein shown and described.

2. The arrangement of the holder A, plate B, screw D, wedge C, and cutters E, substantially as described for the purpose specified.

GILBERT MACKINNON.

Witnesses:
 I. B. SAYLES,
 M. V. WALLING.